A. M. SALAZAR.
COFFEE URN.
APPLICATION FILED JUNE 26, 1919.
1,341,520. Patented May 25, 1920.
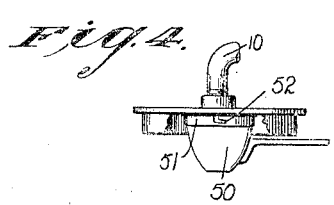
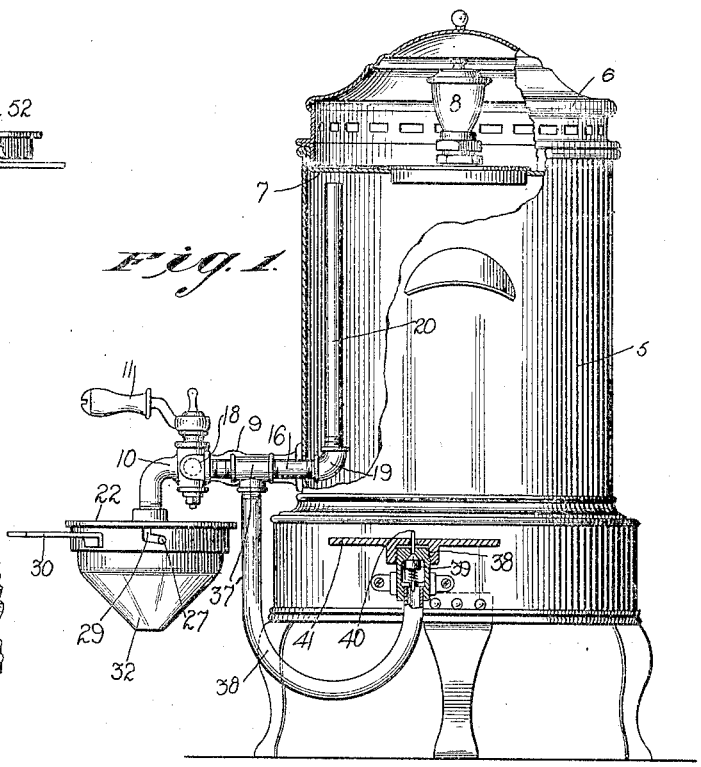
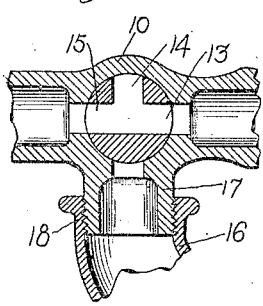
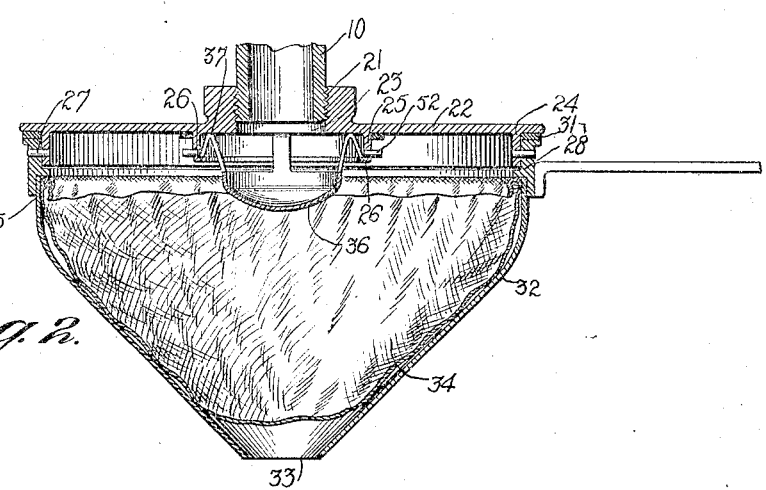
WITNESSES
H. C. Hebig
G. H. Pattison
INVENTOR
A. M. SALAZAR
BY
ATTORNEYS

UNITED STATES PATENT OFFICE.

ALFREDO M. SALAZAR, OF NEW YORK, N. Y.

COFFEE-URN.

1,341,520.   Specification of Letters Patent.   Patented May 25, 1920.

Application filed June 26, 1919. Serial No. 306,818.

*To all whom it may concern:*

Be it known that I, ALFREDO M. SALAZAR, a citizen of Brazil, and a resident of the city of New York, borough of Manhattan, in the county and State of New York, have invented a new and Improved Coffee-Urn, of which the following is a full, clear, and exact description.

The present invention relates to new and useful improvements in machines for making coffee, and pertains more particularly to a new and novel method by which the coffee is prepared.

The primary object of the invention is to so improve the process of making coffee that the ordinary coffee urns commonly used in restaurants and the like may be eliminated and the liquid coffee made direct from the water boiler generally employed in restaurant kitchens.

A further object of the invention is to provide a device in which various quantities of coffee may be brewed at a single operation.

With the above and other objects in view, reference is to be had to the accompanying drawings in which—

Figure 1 is a view partly in elevation and partly in section of a device constructed in accordance with the present invention;

Fig. 2 is a detail sectional view;

Fig. 3 is a detail horizontal sectional view of the faucet;

Fig. 4 is a detail elevational view of a modified form of the invention.

It is a well-known fact that a cup of coffee in order to be palatable should be freshly made and free from a large amount of coffee tannic acid. With this end in view the invention comprises suitable mechanism combined with an ordinary water heater of the commonly called urn type, by means of which one or more cups of coffee may be made just prior to their consumption, thus eliminating the necessity of allowing the coffee to stand any length of time as is the general practice when the ordinary type of coffee urn is used for dispensing coffee.

Referring to the drawings, the device comprises a suitable water-heating urn 5, which may be supplied with heat in any well-known manner, and said water urn is provided with a removable cover 6 and a top partition 7, said top partition carrying the ordinary blow-off valve 8.

Leading into the front wall of the urn 5, is a pipe 9, and connected to the outer end of said pipe 9, is a faucet 10, the operation of which is controlled by means of a handle 11. The valve of this faucet 10 is of the two-way type, and is provided with passages 13, 14 and 15. The reference character 16 designates a pipe, which passes through the front wall of the urn 5, and is connected to an extension 17 of the faucet 10, as shown at 18 in Fig. 3. Connected to this pipe 16, by means of an elbow 19, is a vertically-extending pipe 20, the upper end of which terminates at a point slightly below the partition 7.

Removably secured as by the thread 21, to the discharge end of the faucet 10, is a disk 22, and said disk is provided centrally with a passage 23, and near its periphery on its under face, with a depending flange 24. This disk is also provided near its center portion with a depending flange 25, which flange is provided on its bottom edge with a right-angular flange 26. The depending flange 24 is provided at diametrically opposite points with pins 27, and adapted to embrace the depending flange 24 is an annular ring 28, which latter is provided with angular slots 29 adapted to receive the heretofore mentioned pins 27. One leg of the slot 29 is inclined so that as the ring is turned about the flange 24 by means of the handle 30, the same is drawn upwardly against a suitable packing 31 by means of which a tight joint between the plate 22 and the annular ring 28 is obtained. Depending from the annular ring 28 is a tapered receptacle 32, which receptacle is provided with a discharge outlet 33. Mounted within the tapered receptacle 32 is a fabric lining 34, which is held in place by means of a resilient metallic band 35.

Mounted centrally of the plate 22 is a deflector 36, said deflector being suspended by means of the angular arm 37, the free ends of which are angularly bent to engage the heretofore mentioned angular flange 26.

By this construction it will be seen that the liquid discharged through the discharge opening of the faucet 10, will be evenly distributed throughout the tapered receptacle 32, the purpose of which will be hereinafter described.

The reference character 37' designates a T-coupling secured in the pipe 16, and branching off said T-coupling is a pipe 38 the upper curved end of which is provided with a valve 39 operated by means of a stem 40. A pot or pan stand 41 is screw-threaded on to the upper end of the pipe 38, as shown in section in Fig. 1, and the operating stem 40 of the valve 39 projects above said stand 41, as shown. By this arrangement, it will be seen that when the pan is placed on the stand 41, the valve 39 will be opened and steam will flow from the pipe 20, through the pipe 16 and pipe 38 to keep the contents of the pot or pan on the stand 41 warm.

The operation of this form of the device is as follows: The required quantity of ground coffee to make the number of cups desired is placed in the receptacle 34, and said receptacle is positioned on the end of the faucet 10 by passing the slot 29 in its flanged top edge about the pins 27 in the manner heretofore described. The handle 11 is now turned to open the valve and steam is admitted by way of the passages 14 and 15 to the receptacle 32. This admission of steam to the receptacle 32 liberates the oils from the coffee, and upon turning the valve farther, the steam supply is cut off and hot water is passed through the receptacle 32. By this arrangement it will be apparent that the coffee is made just prior to its consumption, and that each customer is assured of receiving coffee which has not been standing for an appreciable length of time.

In the modified form of the invention shown in Fig. 4, a similar receptacle 50 is employed, and said receptacle is provided with a notched flange 51, the notches of which are adapted to engage the pins 52 mounted at diametrically opposite points on the depending flange 25.

In the modified form of the invention, the device disclosed is intended for the making of one or two cups of coffee, while in the form shown in Fig. 1, as many as ten or even more, cups of coffee may be made at a single operation.

While in the present disclosure there has been shown a two-way valve for controlling the passage of steam and water from the heater 5, it is to be understood that a single valve may be employed in both the water-discharge pipe and the steam-discharge pipe, or in lieu of the two-way valve any number of valves which it may be found are necessary for the successful operation of the device may be employed.

Having thus described the invention, what I claim as new and desire to secure by Letters Patent is—

A device for brewing beverages comprising a steam generating receptacle, a faucet carried by said receptacle on the exterior thereof and in communication with the steam space of the steam generating receptacle and the fluid from which the steam is generated, a disk adapted to be removably secured to said faucet, said disk having inner and outer concentric flanges, a funnel-shaped receptacle adapted to be secured to the outer of said flanges, a closed bag within said funnel-shaped receptacle and in communication with the discharge of the said faucet, and a fluid spreading device comprising a cup-shaped member removably secured to the inner of said concentric flanges and in direct line with and proximity to the discharge of said faucet.

ALFREDO M. SALAZAR.